United States Patent
Ruppert et al.

(10) Patent No.: US 10,754,418 B1
(45) Date of Patent: Aug. 25, 2020

(54) USING BODY SURFACES FOR PLACING AUGMENTED REALITY CONTENT

(71) Applicant: Amazon Technologies, Inc., Reno, NV (US)

(72) Inventors: Chase Ruppert, San Bruno, CA (US); Michelle Abraham, San Francisco, CA (US); Pratik Patel, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/950,927

(22) Filed: Apr. 11, 2018

(51) Int. Cl.
*G06F 3/01* (2006.01)
*G06T 7/70* (2017.01)
*G06T 19/00* (2011.01)

(52) U.S. Cl.
CPC .............. *G06F 3/011* (2013.01); *G06F 3/017* (2013.01); *G06T 7/70* (2017.01); *G06T 19/006* (2013.01)

(58) Field of Classification Search
CPC . G06F 3/011; G06F 3/017; G06T 7/70; G06T 19/006
See application file for complete search history.

(56) References Cited

U.S. PATENT DOCUMENTS

| | | | | |
|---|---|---|---|---|
| 2014/0055343 A1* | 2/2014 | Kim | ........................ | G06F 3/005 345/156 |
| 2015/0309629 A1* | 10/2015 | Amariutei | ............... | G06F 3/017 345/173 |
| 2017/0123487 A1* | 5/2017 | Hazra | ..................... | G06F 3/015 |
| 2019/0121522 A1* | 4/2019 | Davis | .................. | G06F 3/04815 |

* cited by examiner

*Primary Examiner* — Chong Wu
(74) *Attorney, Agent, or Firm* — Hogan Lovells US LLP

(57) ABSTRACT

Parts of the body of a user can be used as surfaces for rendering content, such as augmented reality (AR) content. A computing device executing an AR application can detect body parts in an augmented reality view, such as a hand within a field of view of a camera capturing image data for the application. A type of content to be displayed can be determined based on the type and orientation of the body part, in addition to the location and orientation of the device. The content can vary with changes in the orientation of the body part or motion to cause another body part to be visible. A user can make a selection or input for the content by contacting the surface of the body part onto which the content is projected, providing tactile feedback to the user as well as a determinable action for the device.

18 Claims, 11 Drawing Sheets

USING BODY SURFACES FOR PLACING AUGMENTED REALITY CONTENT

BACKGROUND

The widespread adoption of portable computing devices, such as smartphones and tablet computers, has resulted in a corresponding increase in the amount and types of electronic content available to users. This includes the providing of augmented reality (AR) content, where image data can be captured for a location and a computing device can render content such that the content appears, at least as displayed on a screen of the device, that the content exists in that physical location. In many situations the device performing the rendering will attempt to determine an appropriate surface or object to use as a location for displaying the AR content. There will not always be appropriate surfaces or objects available, and displaying AR content at a distance from physical objects or surfaces detracts from the perceived realism of the augmented reality experience.

BRIEF DESCRIPTION OF THE DRAWINGS

Various embodiments in accordance with the present disclosure will be described with reference to the drawings, in which.

DETAILED DESCRIPTION

Figure 1A:
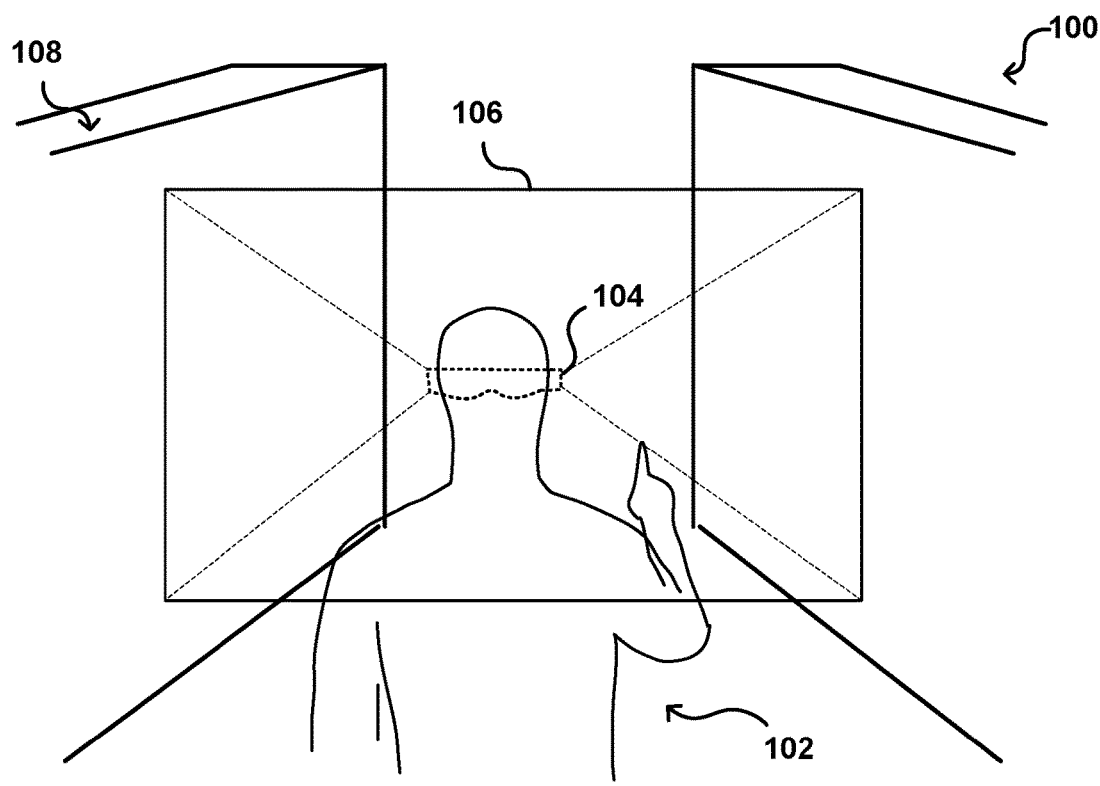
FIGS. 1A, 1B, and 1C illustrate approaches for displaying augmented reality content that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the presentation of dynamically rendered content, such as augmented reality (AR) or virtual reality (VR) content. In particular, various approaches provide for the dynamic projection of AR content onto portions or parts of a user's body. When determining position data for rendering AR content, a device will often capture image data of the surrounding scene, including visible objects and other visual aspects of the environment. This image data can be used to detect body parts brought within an augmented reality view, such as when a user moves his or her hand in front of a camera capturing the image data for the AR application. A type of content to be displayed can be determined based not only on the location and orientation of the device in an augmented reality session, for example, but also on the type of body part and the relative orientation of that body part. For example, a first type of content might be projected onto the user's right palm, and a second type projected onto the back of the user's right hand when visible to the AR application. The content might also change with changes in the orientation of the body part or motion to cause another body part to be visible. Various motions or gestures can cause the content to change as well. A user can make a selection or input for the content by contacting the surface of the body part onto which the content is projected. The contact provides tactile feedback to the user, as well as a determinable action for the device. The type of contact can be used, along with the corresponding AR content for the contact location, to determine an action or input for the AR application.

Various other functions can be implemented within the various embodiments as well as discussed and suggested elsewhere herein.

There can be various situations where it may be desirable to render or provide augmented reality (AR) content to one or more viewers through one or more electronic devices. As known for AR content, the view and content displayed on each device can be a function of the location of the device in at least some embodiments, as well as the orientation (or changes in orientation) of the device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

There are various challenges in rendering AR content in various random locations. For example, to provide a sense of realism it is often desirable to render the AR content to appear to be in contact with, or at least positioned relative to, a physical object visible in the surrounding scene. It will often be the case, however, that there is no physical surface visible that is of the appropriate size, orientation, and relative location, and that is further free of obstructions or other issues when attempting to render the relevant AR content. Further, even when the AR content is rendered relative to a view of a physical object there are challenges in a user interacting with the AR content. For example, a user might want to select an item from a list displayed over a view of a table. The user would have to make a determined type of gesture to indicate the interaction, and the device would need to determine when the interaction is intended and completed. It can be difficult for devices to determine when a gesture is moving to the top item on the list versus attempting to scroll down on the list, as the general directions and locations of the relevant gestures are similar. One approach would be to have the user make different gestures for the different intended actions, but the need for the user to learn a multitude of different gestures can degrade the overall user experience.

Accordingly, approaches in accordance with various embodiments attempt to utilize surfaces that are determinable and readily available in most situations and environments. Further, approaches in accordance with various embodiments attempt to utilize physical surfaces with which a user can interact, in order to provide tactile feedback to the user, independent of any visual indicators, sounds, or other mechanisms used to provide an indication of a determined action, gesture, or input.

In various embodiments, an AR application (or other application or service that utilizes AR content) can leverage technology in the relevant hardware to detect the presence of an object, such as a portion of a user's body, in a field of view in which the AR content is to be displayed. This can include, for example, a hand or arm of the user passing in the field of view of a camera capturing image data for a scene, or passing in the viewable area of AR goggles or other hardware, among other such options. In some embodiments a point cloud will be generated from captured image data that will enable the presence of an object such as a hand or arm to be detected in the relevant area. This object can then be analyzed to determine a surface for rendering the relevant AR content. While parts or portions of a user's body are used for purposes of explanation, it should be understood that various approaches can be extended to other physical objects as well within the scope of the various embodiments.

Once identified, the relevant surface(s) of those physical objects can be used to project virtual displays in augmented reality, with an advantage of providing for tactile interaction. Instead of requiring gestures to interact with the virtual environment, the display (such as a virtual tablet or screen) can be projected such that the virtual surface of the display corresponds to the surface of, for example, the user's hand or forearm, as visible from the camera or other sensor of the relevant hardware. Instead of a user (or device) having to guess as to when a fingertip makes a selection with a virtual button, the act of the finger coming into contact with the determined surface can provide feedback both to the user and to the device. Further, something as simple as scrolling content on the virtual display can be controlled as naturally as a user dragging a finger across the surface of the forearm, much like the user would interact with a conventional touchscreen. The meeting of physical and virtual provides tactile feedback, which gives an engaging experience for the user, and the use of the user's own body provides a convenient way to interact with virtual elements.

Figure 1B:
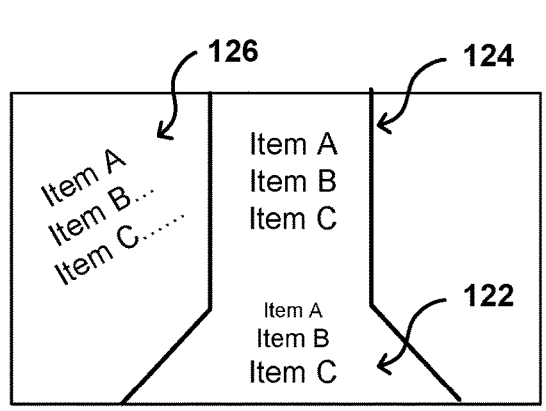
Figure 1C:
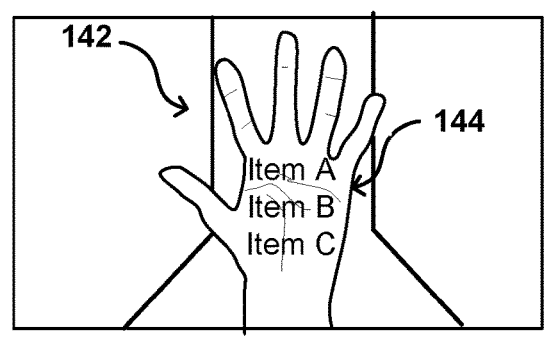

FIGS. 1A through 1C illustrate advantages of such an approach that can be obtained within the scope of various embodiments. In the example situation 100 of FIG. 1A, a user 102 is wearing a pair of augmented reality (AR) goggles 104, which may be paired or otherwise connected with an electronic device such as a smartphone in at least some embodiments, although in some embodiments computing components can be contained within the goggles, or accessed remotely through a network connection, among other such options. The user could use another AR display device as well, such as a smartphone or tablet, etc., wherein the augmented reality content is displayed on a display screen or other mechanism of the device as discussed elsewhere herein. In this example, the user is located in a scene or location where there are physical objects 108 corresponding to racks, as may be positioned along the sides of an aisle of a brick and mortar store. There will typically be a field of view 106 available to the AR goggles in this example, as either visible through the goggles based on the current orientation or as captured through at least one camera or sensor, among other such options. An augmented reality application might be able to use location information from the device, such as may be provided by a GPS or other location sensor, to determine a type of location or scene in which the AR goggles are located. The AR application can then determine AR content to be rendered for display with respect to physical objects in that scene. This might include, for example, information for products located somewhere in that particular aisle.

In many instances, it will be desirable to display the information relevant to the scene or location. The example display 120 of FIG. 1B illustrates various approaches to positioning the AR content with respect to the objects in the scene. As discussed in more detail elsewhere herein, an AR application in many instances will attempt to locate a physical surface that is appropriate for rendering AR content. In the store situation of FIG. 1A, this might include a surface of the floor of the aisle, where content 122 could be rendered to appear to be positioned on the floor. This is not necessarily ideal, as the user's eyes will be diverted away from the objects of interest in the scene. Further, there may be people or other objects that will be positioned in, or will move along, the aisle and potentially obstruct the surface or appear to walk through the AR content, which can negatively impact the sense of realism. AR content 126 could also be rendered along the shelving on the sides of the aisle, but this may need to be at a relatively steep angle to match the shelving which could make it difficult to read, or would need to appear to float out from the shelving. Such an approach would be similar to rendering AR content 124 that is not tied to a physical object but instead floating in front of the user, which does not provide a sense of realism with respect to the AR content. Further, as mentioned, it can be difficult for a user to interact with such content.

Accordingly, approaches in accordance with various embodiments can utilize parts or portions of a user's body for use as AR projection surfaces. For instance, in the example image 140 of FIG. 1C the user has brought his or her hand 142 into view through the augmented reality display. The hand can be detected, as discussed elsewhere herein, and an appropriate surface of the hand used for projecting the AR content to be rendered. In this example, AR content 144 corresponding to a list of items available in that aisle can be rendered to appear, when displayed as an overlay over a live view of the scene including the hand, to be positioned on the hand or palm of the user. This provides a sense of realism, as the AR content appears to be positioned on the hand, and can move with the hand in the view. Further, a user can interact with the AR content by touching or otherwise interacting or coming into contact with a portion of the user's hand upon which the AR content appears to be projected. This provides tactile feedback to the user, and also helps to facilitate interaction determinations for the AR device with respect to the user motion or gesture. The user can also move the hand closer or further away as needed to increase or decrease the size of the content displayed.

As mentioned, this can improve the overall user experience with respect to AR content corresponding to interactable elements. One can consider the effort needed to interact with a virtual element, or virtual screen, that is rendered to appear to be floating in front of the user versus a screen that is "attached" to the user's own body. If the floating AR element is not positioned in a way that is easily accessible to the user, or "reachable" by the user, a gesture (or series of gestures) may be required to interact with the content. However, for content is that is mapped to a part of the user's body, interacting with that surface will not require any gestures at all in at least some embodiments, but rather just a motion of the user's body, whether the part of the body corresponding to the projection or a finger that can contact that part of the body, among other such options. The simplicity of the interaction, with respect to complex gestures, requires less fine motor skills, such as may be required for specific gestures involving the fingers or swiping motions.

Further, mapping virtual content to the user's body allows the view of the AR world to be less obstructed with virtual content, at least from the perspective of the user. Having virtual displays being shown in front of, or around, the user could potentially occlude important details of the physical environment. Having the content projected onto the user's body, however, enables the user to choose to move the content into view by moving their body, such as by raising a hand or forearm. Similarly, the content can be dismissed by a reverse or other basic motion, such as by lowering or relaxing the hand or forearm. Additionally, multiple instances of virtual content can be mapped to different parts of the body. For example, in a grocery store, a scrollable shopping list could be virtually attached to the user's right forearm, while product review information could be listed on the user's other forearm with respect to an item being held by the user. While sitting, it might be more convenient to attach a virtual display to the user's knees or thighs, and so on.

Figure 2A:
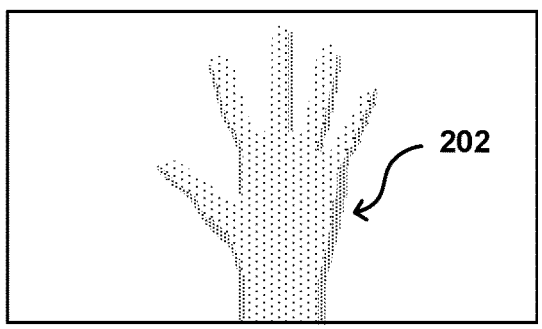
FIGS. 2A, 2B, 2C, 2D, 2E, and 2F illustrate example approaches for displaying augmented reality content with respect to a body part of a user that can be utilized in accordance with various embodiments.
Figure 2B:
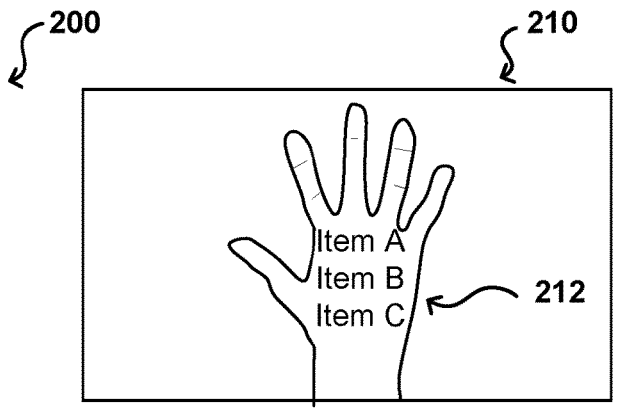
Figure 2C:
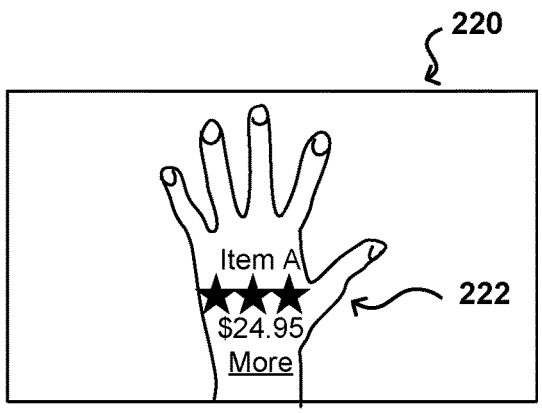

The type, selection, arrangement, and/or location of the augmented reality content can thus be based not only on the location of the user or context of the scene or environment, but also the surface that the user is exposing to the augmented realty device. As discussed in more detail elsewhere herein, a user can bring a body part, such as a hand, into view of a camera or other sensor of the device. The device can capture image data including a representation of the hand, which can be analyzed to generate a point cloud 202 or other three-dimensional representation of the surface of the hand as visible to the device, as illustrated in the example situation 200 of FIG. 2A. The point cloud data can be used to identify the body part, as well as a relative orientation of the body part and information about the exposed surface. As mentioned, in some embodiments the content displayed can depend at least in part upon the type of body part detected, as well as the surface that is visible to the device. In the example view 210 of FIG. 2B, the palm of a user's hand is detected. Accordingly, the surface of the palm of that hand can be used as a surface upon which to project AR content 212, such as a list of items available in a specific aisle or location. If the user rotates the hand such that the back of the hand is visible, however, such as is illustrated in the example view of FIG. 2C, another type of AR content might be displayed that appears on the back of the hand, and provides another type of information. In this example, the content includes more detailed information for one of the items for which content was displayed relative to the palm of the hand in FIG. 2B. In this way, a user can quickly access different types of information through simple motions of the user's body. A user can also have the ability, in at least some embodiments, to customize the types of information available for different body parts or portions.

Figure 2D:
Figure 2E:
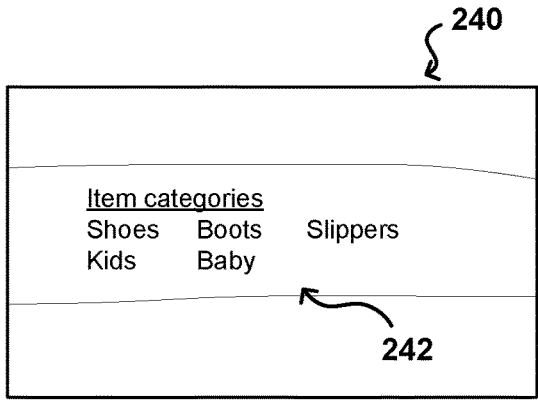
Figure 2F:
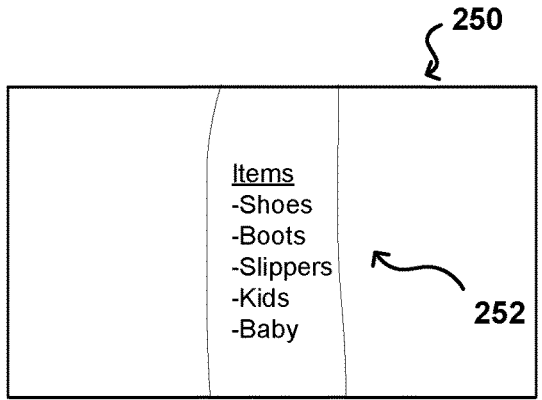

A user can also have the potential to change the information displayed based at least in part upon the orientation of the body part (relative to the computing device or an absolute orientation) or a portion of the body that is contained within a field of view for AR content. For example, in FIG. 2D the user has rotated his or her hand relative to the orientation in FIG. 2C, and has caused a portion of the user's wrist and forearm to also be in view. As illustrated, the AR content 232 displayed in the example image 230 relates to one of the reviews of the item of interest. As illustrated, the arrangement or configuration of the content can be selected or adjusted based upon the size and shape of the surface at the current orientation. If the user instead caused only the forearm to be visible to the AR application, as illustrated in the example view 240 of FIG. 2E, a different type of AR content 242 might be displayed, here indicating categories of items available in the corresponding aisle. In some instances changing the orientation may not change the selection of AR content but may instead change its orientation or configuration, as illustrated in the example view 250 of FIG. 2F, wherein the same content is displayed as in FIG. 2E, but the orientation or layout has been adjusted to match or correspond to the surface area available due to the change in orientation. In at least some embodiments a content arrangement, placement, or packing algorithm can be used to attempt to fill or utilize the available space in a way that is most appropriate, optimal, or at least satisfies a placement criterion for the selected AR content. In some embodiments the content may be "locked" to a certain orientation, and may not change in appearance, layout, or content with changes in orientation of the visible body part or portion. The content may also be of a certain set size, or can be allowed to change in size such as to get larger as the distance between the user's body part and the camera decreases, etc.

Figure 3A:
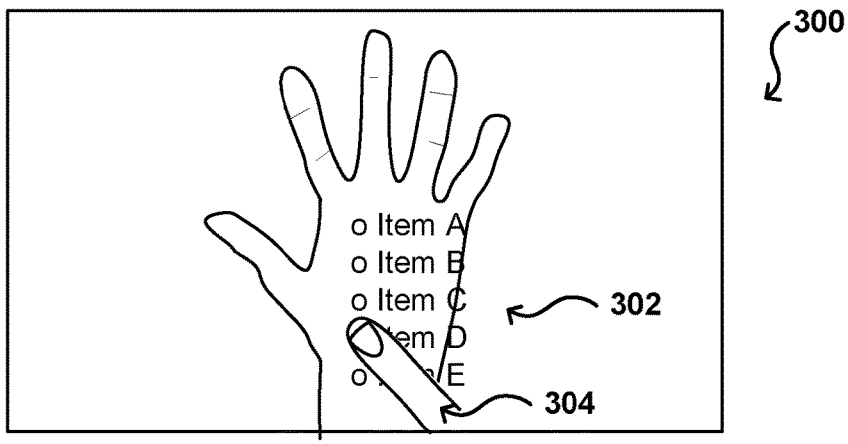
FIGS. 3A, 3B, 3C, and 3D illustrate an example approaches to enabling a user to interact with augmented reality content rendered with respect to a body part of the user that can be utilized in accordance with various embodiments.

As mentioned, in addition to providing an adequate surface for projecting AR content, the use of body parts can provide a source of tactile feedback for the user. Such an approach also increases accuracy in the determination of selection actions taken by a user. For example, the view 300 illustrated in FIG. 3A includes a list of content 302 projected onto a hand of the user. From the perspective of a camera of a computing device, for example, it might otherwise be difficult to determine when a user intends to select one of the items of AR content. In this example, however, the finger 304 (or other selection object) of the user can be brought into contact with the hand of the user. In addition to providing tactile feedback to the user, the contact will cause the finger to stop when it hits the surface of the hand (or shortly thereafter depending upon how hard the user pushes into the skin). The finger will also remain in that position in most instances for a period of time, referred to herein as a dwell time. The stopping of motion and remaining in place for a dwell time can indicate to the computing device that the user is intending a selection action when the placement of the finger at the dwell location corresponds to an instance of the AR content. Thus, if motion of the finger 304 is detected and the motion stops for a period of time in a location that is associated with Item D of the list, then the computing device can determine that the motion indicates an intention to select, or interact with, the content for Item D.

Figure 3B:
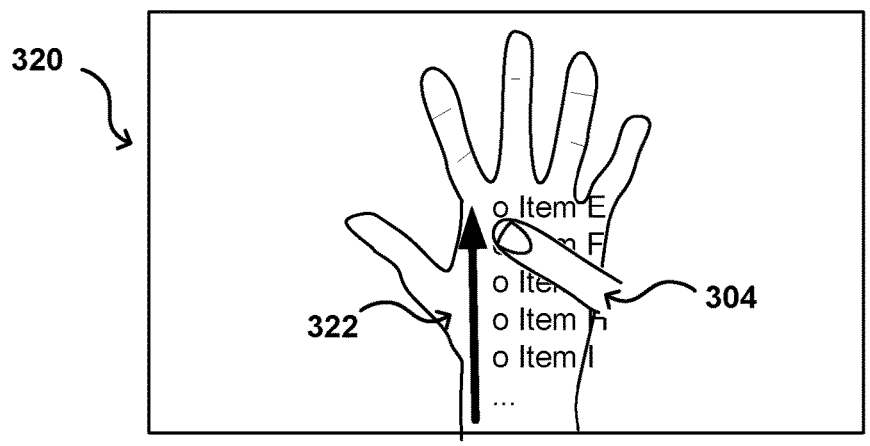
Figure 3C:
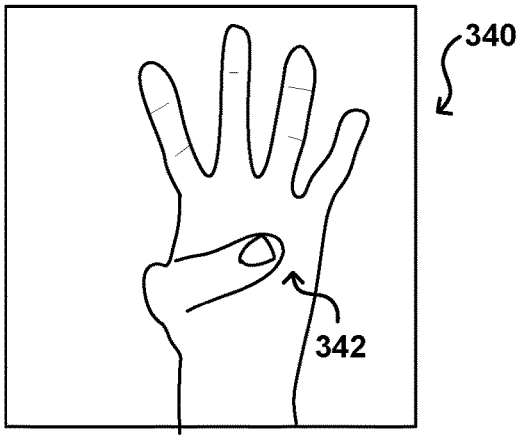

Such an approach also can help to interpret motion of a finger or other selection object. For example, in the view 320 of FIG. 3B the user has moved his or her finger up (in the plane of the figure) along the user's hand. This motion could be interpreted in at least two ways in this example: movement to select a different item, or intent to scroll the list of items. Without a reference surface it might be difficult to discern between the two gestures. In this example, however, contact with the surface and/or the type of motion can be used to determine the motion. For example, if the user intends to select a different item then the user will typically pull the finger away from the surface, or back toward the camera or sensor, before moving to the next intended location. If the user intends to scroll, however, the user will keep the finger in contact with the surface of the hand (or other body part) in order to cause the list to scroll, as one might do with a touch screen interface. If the computing device can detect such differences in motion, then the action to be performed can be determined as well. Different fingers might be selected to take different actions as well, such as where a thumb 342 touching the list on the palm as in the view 340 of FIG. 3C causes the list to clear or another action to be performed.

Figure 3D:
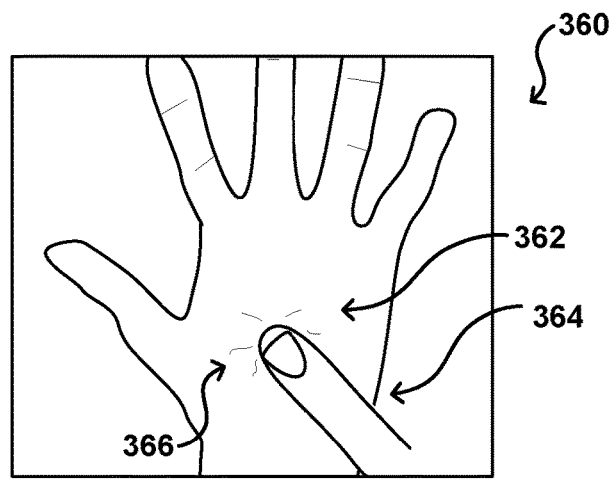

In some embodiments these determinations can be improved by detecting changes in the skin or body part resulting from the various contacts. For example, in the view 360 illustrated in FIG. 3D a finger 364 is being brought into contact with the palm 362 of a user's hand within the view of the AR application. As illustrated, there will be a slight deformation 366 of the skin of the palm due to the contact. The type of deformation can depend upon the force of contact or skin properties of the user, among other such options. The deformation can be determined in a number of different ways, such as by determining changes in the local reflectivity or shadows in the region proximate the contact, or by determining slight changes in the skin proximate the contact, such as by determining slight changes in direction or shape of lines or features on the skin or the palm. In some embodiments, the deformation may be a result of the change in pressure, blood flow, or other aspects of the skin itself, as may be visible through an infrared (IR) sensor or other such mechanism. In some embodiments there may be minimum deformation thresholds specified, such that an action must cause at least a minimum amount of deformation before the motion is determined to be a contact. Detection of these deformations can further help to ensure accurate determinations of skin contact, and thus action determinations.

To further improve the accuracy of such determinations, approaches in accordance with various embodiments can utilize a calibration process. For example, an application or device can instruct the user to touch a surface such as the user's hand, in order to determine an amount of deformation for such an action. Other information can be determined as well, such as distance and time for the action. In some embodiments the process can include instruction the user to perform different actions, such as a tap, dwell, and swipe, in order to more accurately differentiate and/or recognize the various actions. In some embodiments the calibration can be performed for different parts of the body as well, which can have different distance and deformation values. In at least some embodiments this information can be learned over time, such as through machine learning, to provide more accurate and personalized determinations.

As mentioned, the AR content can be rendered and projected with a number of different appearances with respect to the target surface, here a part or portion of a user's body. For example, the AR content can be projected to conform to the surface, similar to how a tattoo might appear, or at least to wrap around the surface like a sleeve. A user might be able to select or configure aspects of the appearance, such as a size, color, or font of the content as projected. The AR content might also be substantially planar but anchored to the skin, such that a selection action for that content would correspond to a user contacting the skin with a finger or other selection object. Various other approaches for rendering AR content can be used as discussed and suggested elsewhere herein.

Certain gestures can also be used to select or change the content displayed. For example, a user might shake a finger or make a fist to perform a specified input action. The user can also change the distance or orientation of a body part as discussed elsewhere herein. A user might also be able to make different motions with different fingers to provide different inputs. The various motions or gestures can be customizable in some embodiments, and a user profile might be generated that can be used to enable the configuration to be ported between different AR applications for use by that user or other authorized users. In some embodiments there may be significantly more content available than can be concurrently displayed with a reasonable size, such that there may be some grouping of the content. Motions or gestures can be used to change the groupings, or view content for different groupings, among other such options. For example, a user might make a swiping or flipping motion to go to the next grouping. As mentioned, the motions or gestures can be used to display different types of information as well, such as images, videos, text, reviews, pricing, and the like.

In various embodiments the image or sensor data can be captured by a computing device associated with the user and located in the region for which the AR content is to be rendered. This image data can be analyzed at least partially on the device, such as to determine the point cloud for objects visible in the scene. The information or content to be displayed through AR can be determined, and the actual content in some embodiments obtained from a remote source across at least one network. In some embodiments the body part analysis may be performed on the device because the determination does not need to be very precise and does not require significant computing resources to determine. The analysis of the image data for determining content to display may be performed in the cloud or by a remote resource in some embodiments, such as where complex image analysis or computer vision algorithms are needed to perform the processing. In some embodiments the AR content will be rendered on the remote device as well, while in other embodiments the computing device can include graphics capability and hardware acceleration, for example, that can enable the device to render the AR content for display in near real time. In some embodiments an existing AR SDK can be leveraged, at least in part, to assist with the projection.

In some embodiments, scene data can correspond to any appropriate location or region, as may correspond to a closed or otherwise defined space. Within this space may be a defined a gameplay field as an example for gaming applications. This may correspond to, for example, a race track, sporting field, or fighting arena, among other such options. It should be understood that the gameplay field can be real and/or virtual, such as may correspond to an actual physical space having physical components, or can correspond to a determined region of a floor (or another such surface or area) where aspects of the field are virtual and only displayed through augmented reality content, among other such options. In such an example there may be multiple players, or viewers, viewing augmented reality content in the game field (or other scene) using a respective augmented reality device. These devices can be any appropriate devices capable of displaying augmented reality content, such as may include smart phones, tablet computers, smart glasses or contacts, AR goggles, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc.

Each device can have a respective field of view that corresponds to a specific portion of the scene. For each device, only AR content corresponding to locations within that field of view will be rendered and displayed, at any given time, by a display of that device. In order to determine the angle and scale, as well as the point of reference for the field of view, the location of the device can also be determined. As mentioned, this can be determined using a GPS-based approach, or can use an iBeacon or triangulation-based approach, among others known or used for device location determination. The location information can help to determine the location of each device in the space, with respect to the gameplay field scene, and with respect to the other devices.

In order to make the AR content appear to be as realistic as possible, it can be desirable in many situations to further cause the rendered objects to appear to be positioned on, or with respect to, actual surfaces in the scene. This can include, for example, being positioned on a track, field surface, tabletop, or other object or element (physical or virtual) in the scene. Further, it can be desirable that these objects are all of the appropriate scale and location with respect to each other, and that these relationships remain consistent unless intentionally varied within the game or content presentation. In order to provide such functionality, it can be desirable to map, model, or otherwise generate an accurate representation of the scene, so that the content can be rendered appropriately with respect to that representation. While in some instances the scene may be a fixed and well-known set of objects that does not change, in other instances the scene may not be well known or may be able to vary throughout the game. In other embodiments the position and/or orientation of a respective device may be unable to be determined with sufficient accuracy to prevent any noise or error from being injected into the AR content as rendered.

It therefore can be desirable in at least some embodiments to determine the distance to various objects, locations, surfaces, and/or points in the gameplay field, or other appropriate area, for each individual device, such that the AR content is rendered and displayed appropriately for that specific device based on the current location and orientation. This can include, for example, capturing image data using a rear facing camera and analyzing that image data using a computer vision algorithm to identify the locations of specific types of surfaces, shapes, points, objects, or other such elements in the scene. Various algorithms can attempt to recognize various features and/or anchor points which can be used to identify surfaces, for example, which can be used as a reference for rendering AR content. Various other approaches can be used as well, as may include structured lighting, stereoscopic imaging, ultrasonic image, LIDAR scanning, and the like. Many portable computing devices or other consumer electronics may not have these and other such sensors or mechanisms, and thus may need to rely upon cameras or more basic data capture mechanisms.

Figure 4A:
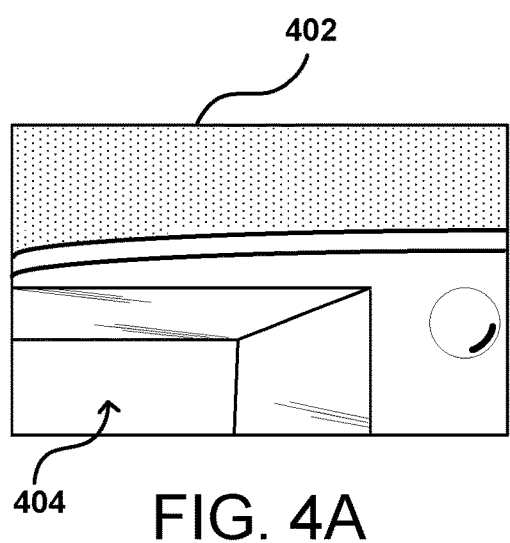
FIGS. 4A, 4B, 4C, and 4D illustrate an example approach to rendering augmented reality content that can be utilized in accordance with various embodiments.
Figure 4B:
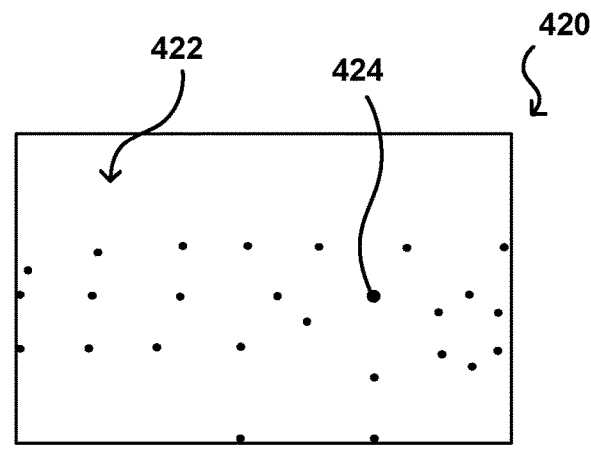

In various embodiments, the scene data to be analyzed from the various devices will correspond to positions of features detected from image or other data captured using a camera or other such sensor or component on each respective device. As illustrated in the example image 400 of FIG. 4A, for a given device image data may be captured that includes representations of various objects within a field of view of the camera or sensor, etc. In at least some embodiments, computer vision algorithms can be used to attempt to recognize objects, or at least differentiate between objects, in the image data and generate or determine representative data points. These points can correspond to unique or representative features, as known for computer vision applications. For a given image, a set of points can be generated as illustrated in the point set 420 of FIG. 4B, where the points can include feature points 422 and various anchor points 424, which can be used to identify specific objects in the scene. As known for various AR applications, anchor points can be used to identify surfaces or other contours or regions respect to which an AR element can be rendered. In various embodiments, each data point in the point set 420 can have coordinate data determined with respect to the device, such as an (x, y, z) or other coordinate set in two or three dimensions, which can be determined with respect to an axis having an origin at the sensor of the device. For example, an x value of 2.1 feet can correspond to 2.1 feet along the x direction from a camera sensor. In order to correlate the data from the various devices, the relative position and orientation of the devices can be determined. For example, the position data from FIG. 4B can be correlated to the gameplay field in FIG. 1A based on the determined position and orientation of the device as determined with respect to the gameplay field. Similar points than then be correlated, and an authoritative position for each point or object determined based on the correlated data.

Figure 4C:
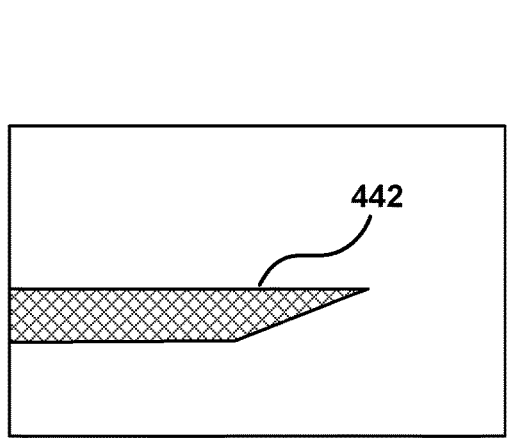
Figure 4D:
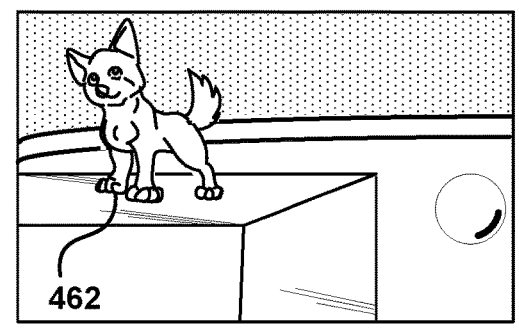

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, the data points from FIG. 4B (and potentially as aggregated or processed as discussed herein) can be analyzed to determine that there is a horizontal surface represented in the data. This can correspond to the box 404 or other such object represented in the image data. In response to detecting such a surface, and in some embodiments ensuring that various criteria are satisfied as may relate to size, angle, or smoothness, etc., a polygon 442 or other geometric shape or construct can be generated as illustrated in the example 440 of FIG. 4C. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. As illustrated in the example image 460 of FIG. 4D, a live view of the gameplay field is displayed as captured by the camera. Based at least in part upon the position of the geometric construct, which would typically not actually be displayed on the screen but maintained as data in memory, can be used as a reference to render a character 462 or other AR element as an overlay with respect to the live view. As the device displayed the content changes position or orientation, the respective position of the geometric construct will change as well. This change can trigger a corresponding change in the rendering of the AR element 462, to maintain a consistent scale, position, and angle with respect to the geometric construct. In this example, the AR content can be rendered such that the dog is displayed to be standing on the box whenever the box is contained in (or near) a field of view of the camera of the device. While the dog or other character can move and perform various actions, its position in the gameplay field (or other such area) can be tracked with respect to at least one anchor point or construct, such that the rendering is consistent not only for a single device but across all devices accessing the AR content for that session and at or near that location.

As mentioned, in order to improve the realism of the augmented reality content it can be desirable to determine lighting state data for the scene that should be used to light or shade the AR object during the rendering process. The lighting state data can also provide the ability in at least some embodiments to adjust the appearance of the AR image, including the live view of the scene, by adjusting one or more aspects of the lighting state. In at least some embodiments, lighting state information, other than or in addition to that related to environment maps as discussed herein, can be obtained or determined using data from a number of different sources. One example source is the captured image data itself. The image data in some embodiments can be analyzed to determine information such as an average brightness and contrast value, or range of those values, for the image as a whole or a portion proximate a location for the AR content. The image data can also be analyzed to attempt to determine the direction of various shadows, such as by determining the longest axis or dimension of each shadow or dominant vector direction, to extrapolate the locations of various light sources that may not be represented in the image data. The image data can also be analyzed to attempt to determine light sources that are represented in the image data, and may analyze the locations of these light sources as represented in the captured image data while the camera (or device including the camera) undergoes orientation changes, such as rotations about an axis, and perform various geometric operations to attempt to determine the locations of those light sources. Other approaches to determining distance and position of objects can be used as well as discussed and suggested elsewhere herein.

Other types of information can be utilized as well. For example, a light sensor of the computing device may be used to determine an ambient light level for a scene, among other such values. Multiple light sensors, or sensors capable of determining values for different regions or directions, can also be used. In some embodiments, information about the time, location, date, and/or orientation of the device (or the camera on the device) can be used to calculate lighting information. For example, an outdoor scene during daylight hours may be primarily illuminated by sunlight. By knowing the geographic location and time of day, an estimate can be made as to the brightness of daylight available and the direction in which the sunlight is received, impacting shadows and other such aspects. Other information can be used to improve the accuracy as well, such as date information which can help to better determine the location of the sun relative to the scene. Information about the weather can also be used if available, and in some embodiments aspects of the image data can be used to determine lighting information. For example, if it is noon on a day when the sun should be directly overhead but the image data or data from the brightness sensor indicate that there is an unexpectedly low level of brightness or ambient light, then it can be assumed that it is a cloudy day or raining, etc. In some embodiments the image data can be analyzed to detect the presence of objects such as snow or water which can impact reflections, shadows, and overall brightness. Various other types of information can be analyzed or considered as well within the scope of the various embodiments.

The information about the various lighting sources, including position, intensity, color, and other such information, can be used to generate a light map for the scene. The light map in some embodiments can include a three-dimensional mapping of any or all determined sources of light that can contribute lighting to the scene. This can include light sources of one or more determined types in some embodiments, as may include the sun and light sources such as bulbs, LEDs, etc. In other embodiments this can include anything that can impact lighting and reflections, as may include snow, water, mirrors, bright objects, and the like. In addition to the position in three dimensions of a reference coordinate system, for example, information for each light source can be tracked and updated over time, such as whether the light source is active or appreciably contributing to the lighting of the scene. This can include, for example, the object having a relative brightness or other such aspect (s) that would impact the appearance of one or more objects in the scene, or the shadow(s) created by those objects. This can be based on a brightness or illumination threshold, or other such criterion. Other aspects such as the current color, intensity, or brightness can be tracked as well. For the sun, moon, or other mobile or non-stationary sources, the position information can also be updated over time as appropriate. Such a map can be used along with a cube map or other environment map to improve the appearance of the AR objects.

Figure 5:
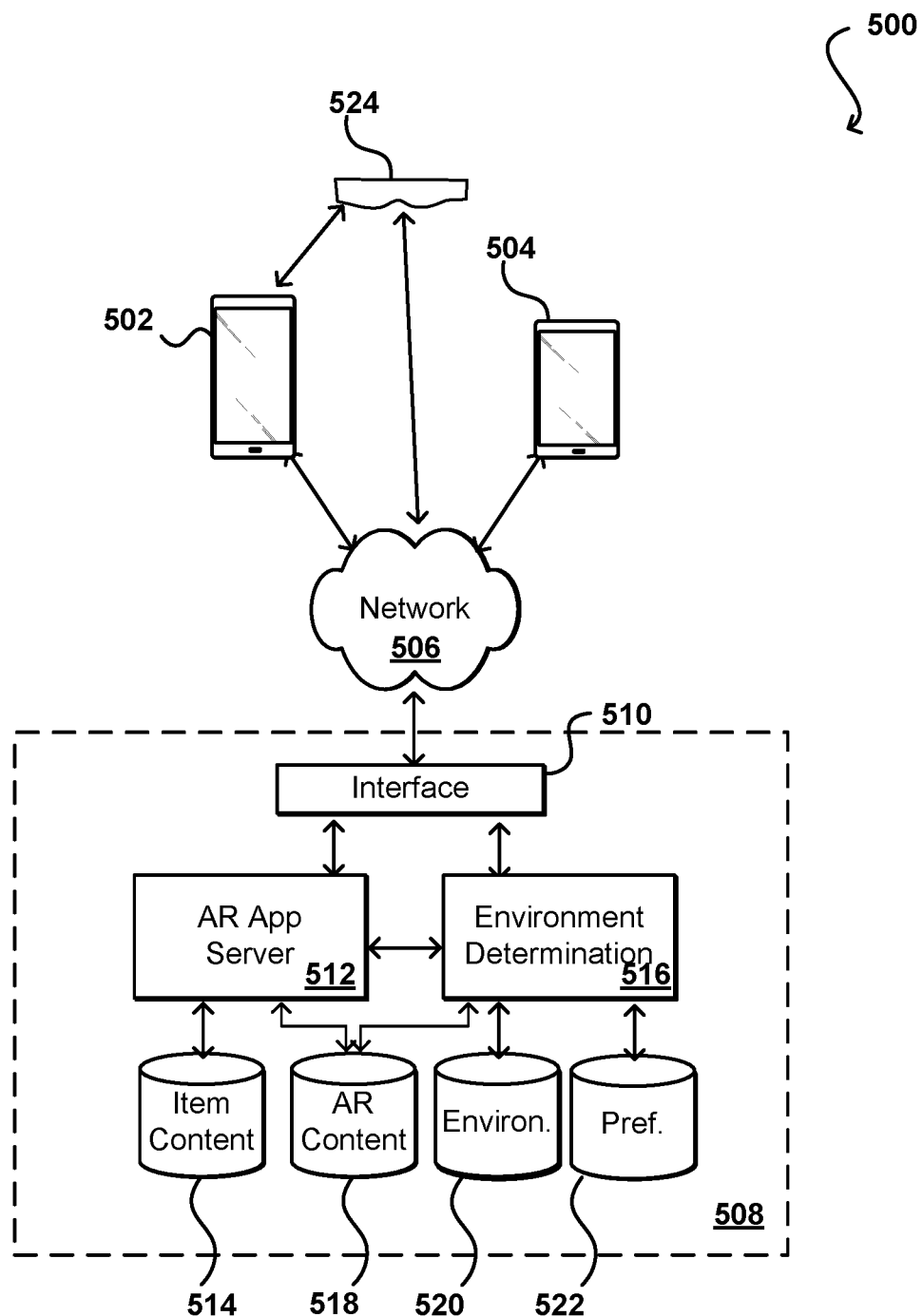
FIG. 5 illustrates an example system that can be used to render AR content relative to detected body parts that can be utilized in accordance with various embodiments.

As mentioned, in various embodiments the environmental mapping can be performed on the individual devices for use in one or more AR applications executing on the device. In some embodiments at least some of the image, scene, or map data can be sent from various devices 502, 504 to a remote service environment 508, or other such system or service, as illustrated in the example system 500 of FIG. 5. While an augmented reality application server is discussed in this example, it should be understood that any service or set of resources dedicated or allocated to generating or managing environmental maps for use in augmented reality and/or other applications can be utilized as well within the scope of the various embodiments. In this example, an AR application, such as an augmented reality-inclusive game, is hosted on at least one application server 512. The application server 512 can be a local machine or a remote server operated by an application or content provider, among other such options. In this example the AR application supports the management of environment maps, such as cube maps, that can be utilized by players or users of the AR application. This can include generating and storing an environment map using data from a first player device 502, or generating a map using data from multiple devices 504, for use with the respective devices or any other device in a scene location corresponding to the environment map. The respective devices 502, 504 can connect to the application server 512 over at least one network 506, such as the Internet, a local area network, a dedicated gaming network, a peer-to-peer network, or a cellular network, among other such options and combinations thereof. The request can be received to an interface, such as an application programming interface (API) of an interface layer 510, which can cause the request to be directed to the application server 512. The application server 512 can then retrieve any appropriate content from a content repository and transmit the application content to the respective device(s). The devices themselves can display the content, or the content can be rendered for display by a device such as AR or VR goggles 524, among other such options.

The environment determination service 516 can receive image data from one of more devices, along with orientation data for each image, that can be stored to an environment image repository 520. This can enable the environment information to be updated or generated on demand, such as when a new session of the application is initiated or when the map is requested by an application on executing on another device. In at least some embodiments the generated environment or scene data will be stored to an environment repository, and the image data used to generate those maps may remain stored in the environment image repository 520 for at least a period of time, or may be deleted once the environment map is generated. In some embodiments the environment may not receive the image data at all but instead might receive environment maps generated by the various device 502, 504, which can then be stored to the map data repository for subsequent retrieval by the same device or potentially other devices for that scene location.

As mentioned, the environment mapping service 516 can store maps or related data for subsequent retrieval by the same user or device, or for different users or devices for a similar scene location. In at least some embodiments the map data can include geographical data, such as geo-coordinates or other such data, that can be used to identify a location corresponding to an environment map. In some instances geographical data can also be received with the image and orientation data for use in more accurately generating an environment map. When a user device is to render AR content in a scene location, the device in some embodiments can first check with the application server 512 to determine whether an environment map exists and is stored in the map repository that can be provided to the device for use in rendering the AR content, at least as a default map that the device can update or build from. The data to be provided can include AR content to be rendered, as pulled from an AR content repository 518, where that content may relate to one or more items identified from an item repository 514, among other such options. The way in which the AR content is selected and/or rendered for display can be based at least in part upon preference information for the user, as may be stored to a preference repository or other such location.

In some embodiments the AR application may relate to a multiplayer gaming application. For such embodiments, players can join in a session of the game with state data that is managed by a game state component of the application server. In some embodiments one or more game servers can execute the game, while in others the servers can manage game state for instances of the game executing on the various player devices. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the server at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices. This can include, for example, maintaining an authoritative point cloud, set of position information, or set of geometric constructs for a gameplay region, such as a room, area, or arena as discussed herein. The server can build up this information using data received from the various devices, and update the information based on updates to the received data. The server can maintain this point or construct data as part of the stored game state, and can send the information across the appropriate network(s) to the various devices as appropriate, such as may be based upon the location and orientation of the device, and the corresponding field of view for which AR content can be rendered. In other embodiments, however, the position or construct data can be sent between devices independent of the game server, either through the network or directly using a local communication protocol (e.g., Bluetooth or NFC). In situations where the data is sent between devices, the devices can either agree upon an authoritative data set or make local determinations for local rendering on the respective devices, among other such options.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

Figure 6:
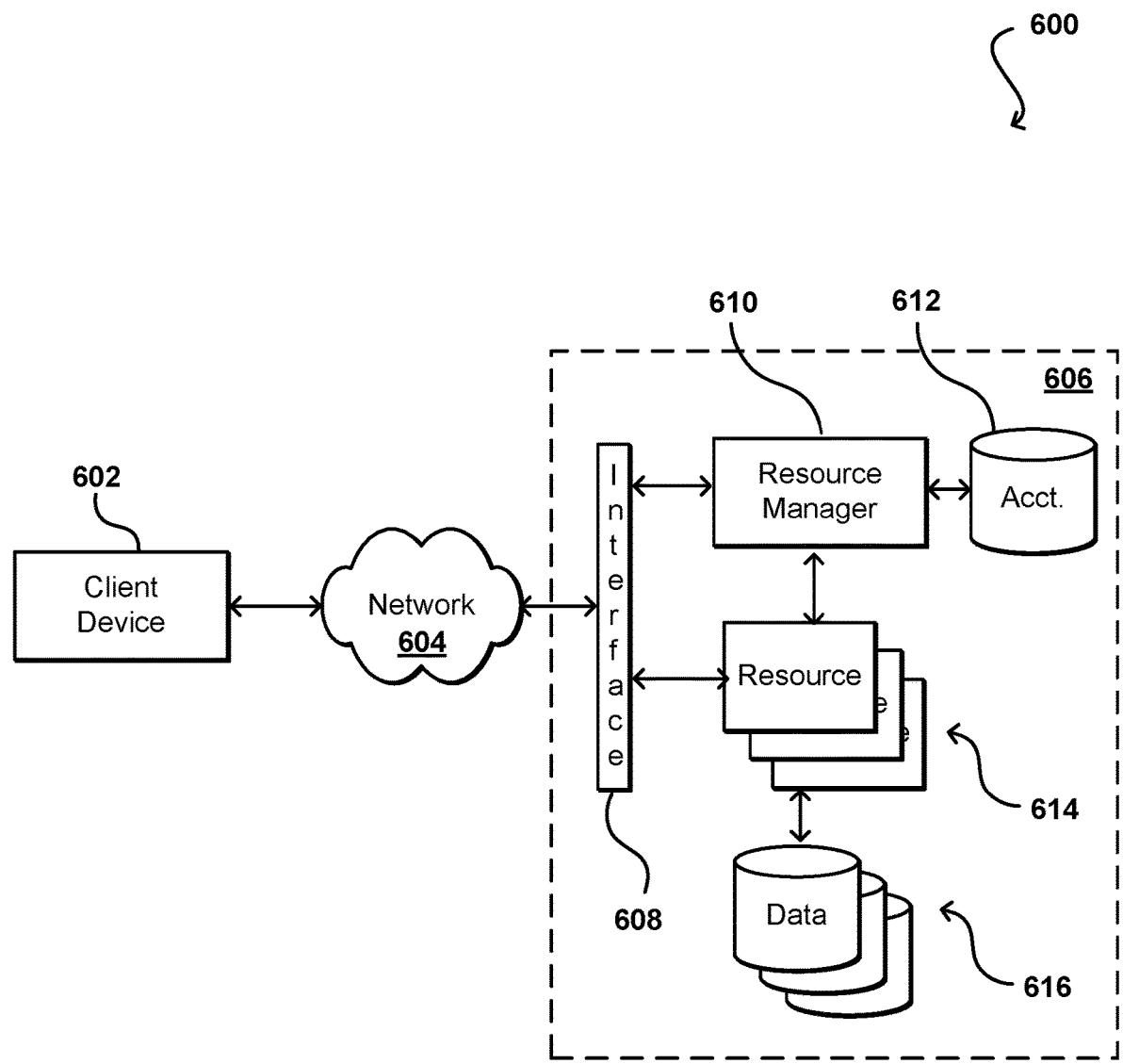
FIG. 6 illustrates an example environment in which various embodiments can be implemented.

FIG. 6 illustrates an example environment 600 in which aspects of the various embodiments can be implemented. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
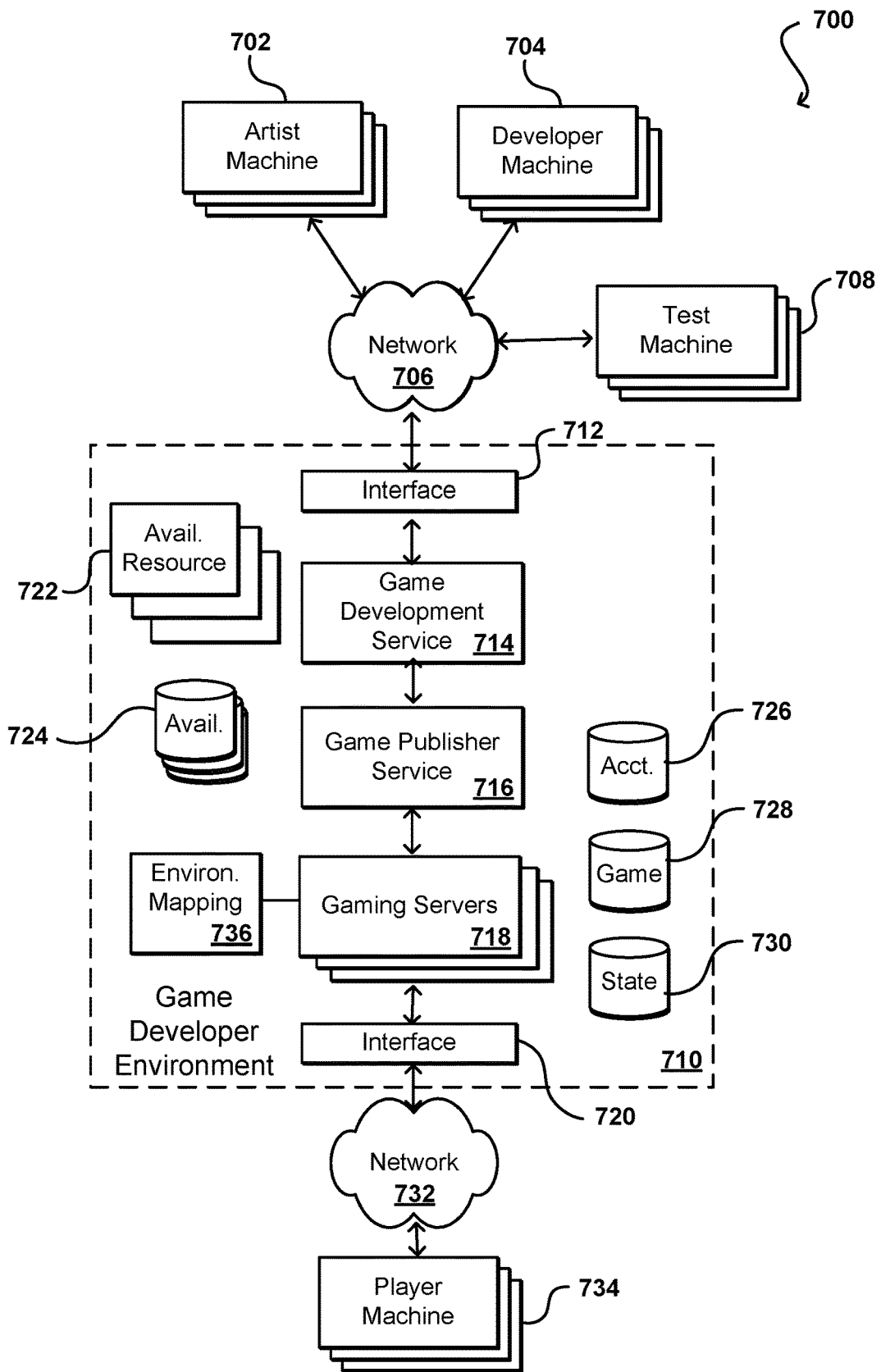
FIG. 7 illustrates an example gaming pipeline that can be used in accordance with various embodiments.

As illustrated in the example system 700 of FIG. 7, at least some of the resources can be used to support platforms and services useful in the development and providing of electronic gaming and three-dimensional graphical content, among other such options. For example, the artist machines 702 and developer machines 704 can collaborate via a game development service 714, which can be provided by a set of resources in a game developer environment 710, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 728, where the repositories can include graphics files, code, audio files, and the like. The game development service 714 can also work with an account manager, or at least maintain information in an account data store 726, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 716. The game publisher service 716 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 704 or otherwise. In some embodiments the game content might be published and made available to one or more test machines 708, which may be associated with the customer, such that the customer can test various builds or versions of the game. In some embodiments feedback provided by the test machines 708 may be provided to the game development service 714, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 718 which can run the game and enable player machines 734 to access the game content over one or more networks 732, which may be different from the network(s) 706 used for game development. This can include, for example, dedicated gaming networks, the Internet, cellular networks, and the like. The player machines 734 can communicate with the appropriate interfaces of an interface layer 720 to obtain the gaming content. In some embodiments the player machines 732 will download the gaming content for execution on the individual machines, and will upload (or otherwise communicate) gaming data, messages, and other information to the gaming servers 718, as well as to other players, social networking sites, or other such recipients. The gaming servers 718 can cause state information for the various instances of the game to be stored to at least one game state repository. This can hold state for the game as a whole or for individual game sessions, among other such options. As mentioned, in some embodiments the devices can send position or image data to a dedicated gaming server 718 or other component in the game developer environment 710, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 734 in order for those devices to render the appropriate AR content for the location and orientation of a given device. In some embodiments the game content can be executed by the game servers and streamed in near real time to the player machines 734. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 718 or other such systems, services, or components can utilize a surface mapping service, for example, that is able to receive position, orientation, and object location data, among other types of data discussed herein, and generate an authoritative mapping of a specific area or region, such as a gameplay region. In this example, each player device 734 can send the information to an allocated gaming server 718 for the gaming session, which can then communicate the relevant information with the surface mapping service so that the surface mapping service can update the authoritative data set as appropriate, as well as to obtain from the mapping service any relevant position or other data that should be sent to one or more devices based on, for example, changes in the orientation or location of the device, as well as for changes of other objects or positions in the mapped region as well. As mentioned, in some embodiments the information can be sent as needed for a current view of a player device, and at least some of that data can be retained in cache or memory on the device such that only changes to the data need to be transmitted, and in some embodiments the devices can each build a model of the mapped region over time. As mentioned, in some embodiments the player devices 734 can communicate with each other as well, such as to send updates in player device location or orientation, or to communicate updates in the authoritative data set, among other such options. The player devices 734 can also send image, coordinate, and/or map data to an environment mapping service 736, which can generate, store, and/or manage environment maps for various devices or locations. This can include not only determining background objects in a scene, but can also include identifying body parts or portions determined in a live view or other relevant window as discussed and suggested in more detail elsewhere herein.

Figure 8:
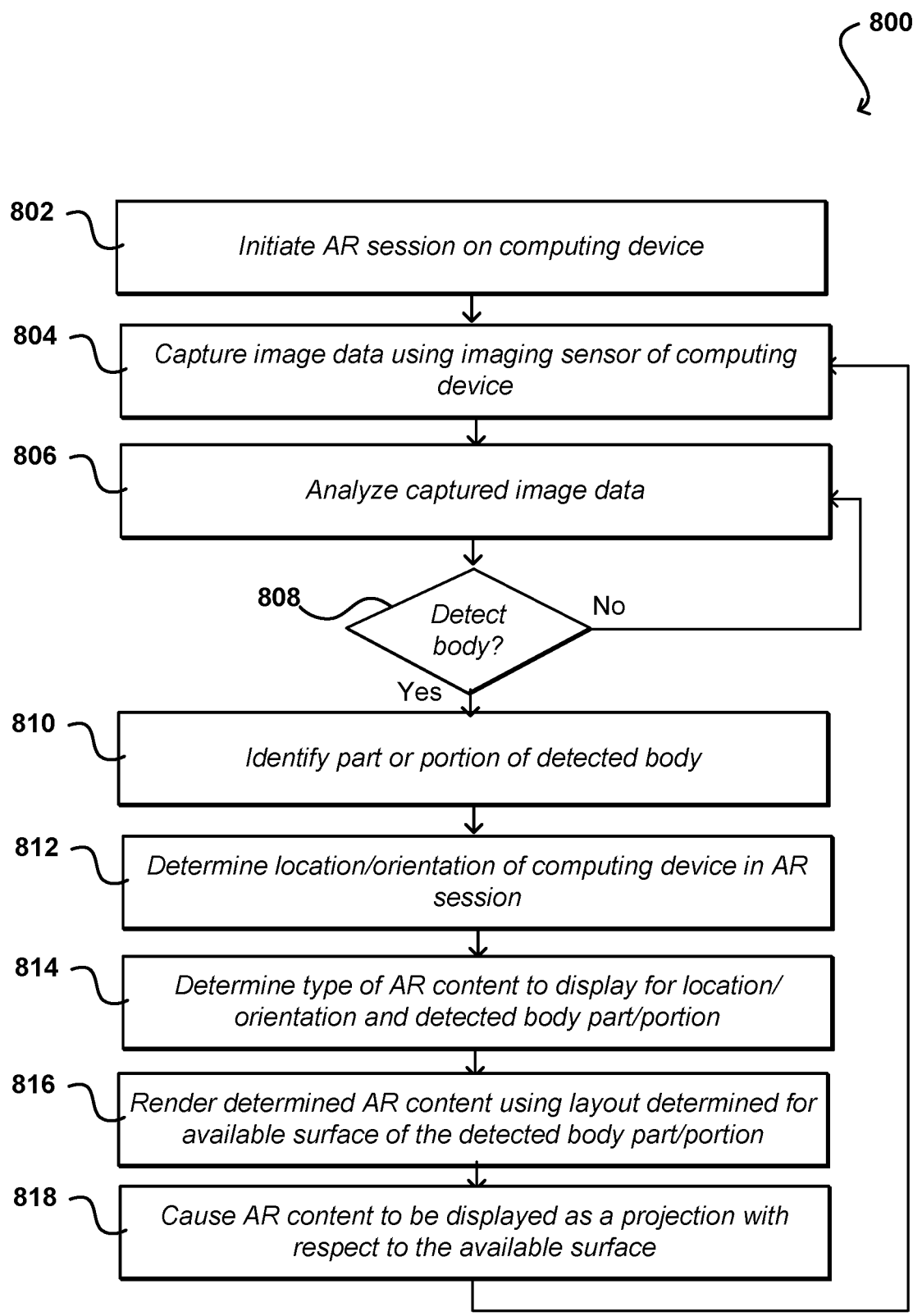
FIG. 8 illustrates an example process for projecting AR content on a body part of a user that can be utilized in accordance with various embodiments.

FIG. 8 illustrates an example process 800 for projecting rendered content on a detected body part that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications and augmented reality are primary examples utilized herein, it should be understood that other types of applications or content can benefit from the advantages of the various embodiments as well as discussed and suggested herein. In this example, an augmented reality (AR) session is initiated 802 on a computing device, although the process can be used for other types of dynamically rendered content as discussed and suggested herein. This can include, for example, a user running an AR-inclusive application on the device or joining in a multiplayer online session, among other options discussed and suggested herein. In order to provide for the rendering of AR content, image data can be captured 804 that is representative of the scene in which the device is located and the AR content is to be rendered. For example, this can include representations of objects, surfaces, and other elements visible from a current location of the computing device or contained within a field of view of a camera (or other imaging sensor) of, or associated with, the computing device, among other such options. The image data can be associated with orientation and position data for the device, in order to correlate the field of view of the camera with a portion of the surrounding scene.

The captured image data can be analyzed 806 to also attempt to determine the presence of a portion of a user's body within a field of view, or actionable view, of a scene from the perspective of an AR device or AR application. As mentioned, an actionable view or area can include the portion of a scene that is currently visible through an AR display, such as a display of AR content through a computing device or AR goggles. This can include an area within a few feet of a camera of the device, for example, which corresponds to the limitations of the human body. This can also correspond to a field of view of a camera capturing image data, which can be used to display AR content based on a current orientation of the AR display device, among other such options. If it is determined 808 that such a body part or portion is detected in an actionable area, the part or portion can be identified 810. As mentioned, this can include determining a point cloud for the body part or portion and analyzing the point cloud data using a set of models or other criteria to determine the part or portion based upon factors such as shape, size, and relative orientation. In addition to identifying the body part, the current location and/or orientation of the computing device in the AR session can be determined 812. This may include an actual location, such as may be based upon GPS coordinates, or a virtual location within a game or other AR application setting. The type of AR content to be displayed can then be determined 814 based at least in part upon the device location and the detected body part. For example, if the device is in a store then the content to be displayed may relate to the store, and the portion of that content to be displayed can depend at least in part upon the type of body part that is detected. The determined AR content can be rendered 816 using a layout that is determined to be appropriate for the visible surface of the body part with respect to the AR application. As mentioned, this may utilize any of a number of packing or arrangement algorithms, among other such options. The AR content can then be caused 818 to be displayed as a projection with respect to the available surface, such that the AR content appears to be connected to, or a part of, the determined body part.

Figure 9:
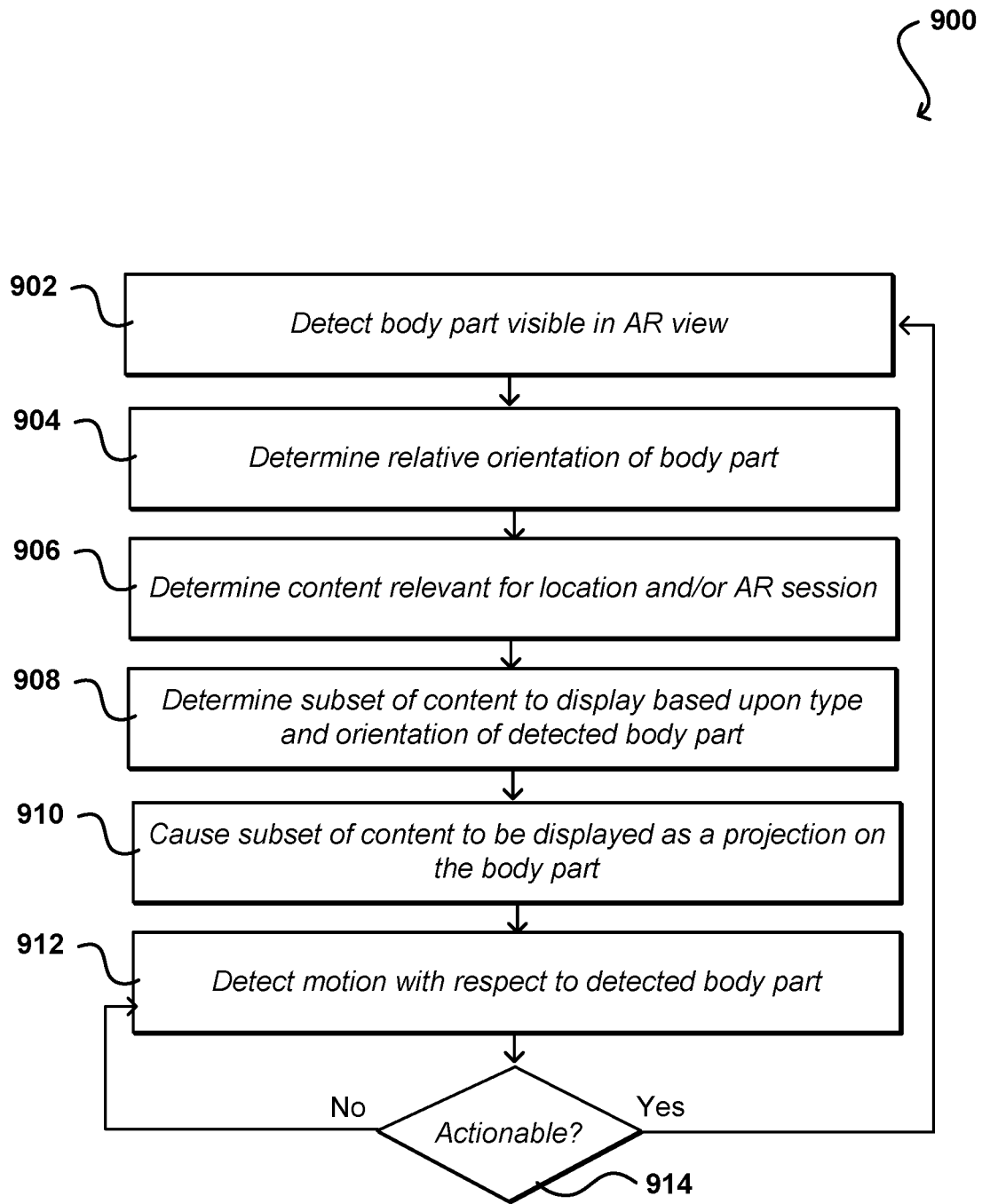
FIG. 9 illustrates an example process determining AR content to display based on a type and orientation of a determined body part that can be utilized in accordance with various embodiments.

FIG. 9 illustrates an example process 900 for modifying displayed AR content based at least in part upon detected motion with respect to a determined body part that can be utilized in accordance with various embodiments. In this example, a body part is detected 902 to be visible in a view of augmented reality or other dynamically rendered content, such as by using a process described with respect to the process 800 of FIG. 8. The data for the body part can be analyzed to determine 904 a relative orientation of the body part, at least with respect to a computing device rendering the AR content. Content relevant to the location and/or AR session can be determined 906 that can be displayed through the AR application. A subset of the available content can be determined 908 that is appropriate for display based at least in part upon the type and orientation of the body part. This can include, for example, determining a type of content to be projected onto a specific body part, such as a hand, as well as for an orientation of that hand with respect to the AR view, such as the back of the hand visible with the fingers pointing to the right in the AR view. As mentioned, the type of content to be displayed can depend upon orientation and visible surface area, among other such factors, in addition to the type of part detected. The selected subset of content can then be caused 910 to be displayed as a projection on the body part in the AR view, such as may conform to the surface or appear to be at least partially connected to the surface, etc. In at least some embodiments the content can appear to move with the body part in the view. A motion can be detected 912 with respect to the detected body part. This can include a change in placement or orientation of the body part, or of an object relative to the body part, among other such options. A determination can be made 914 as to whether the motion is actionable. This can include, for example, whether the motion corresponds to a change in orientation of the body part such that other content may be displayed, or if the motion corresponds to a selection action with respect to the displayed AR content, among other such options. If the action is determined to be actionable, then another determination can be made as to the type of AR content to be displayed based at least in part upon the motion, as well as the detected orientation of one or more body parts resulting from the motion as discussed herein.

Figure 10:
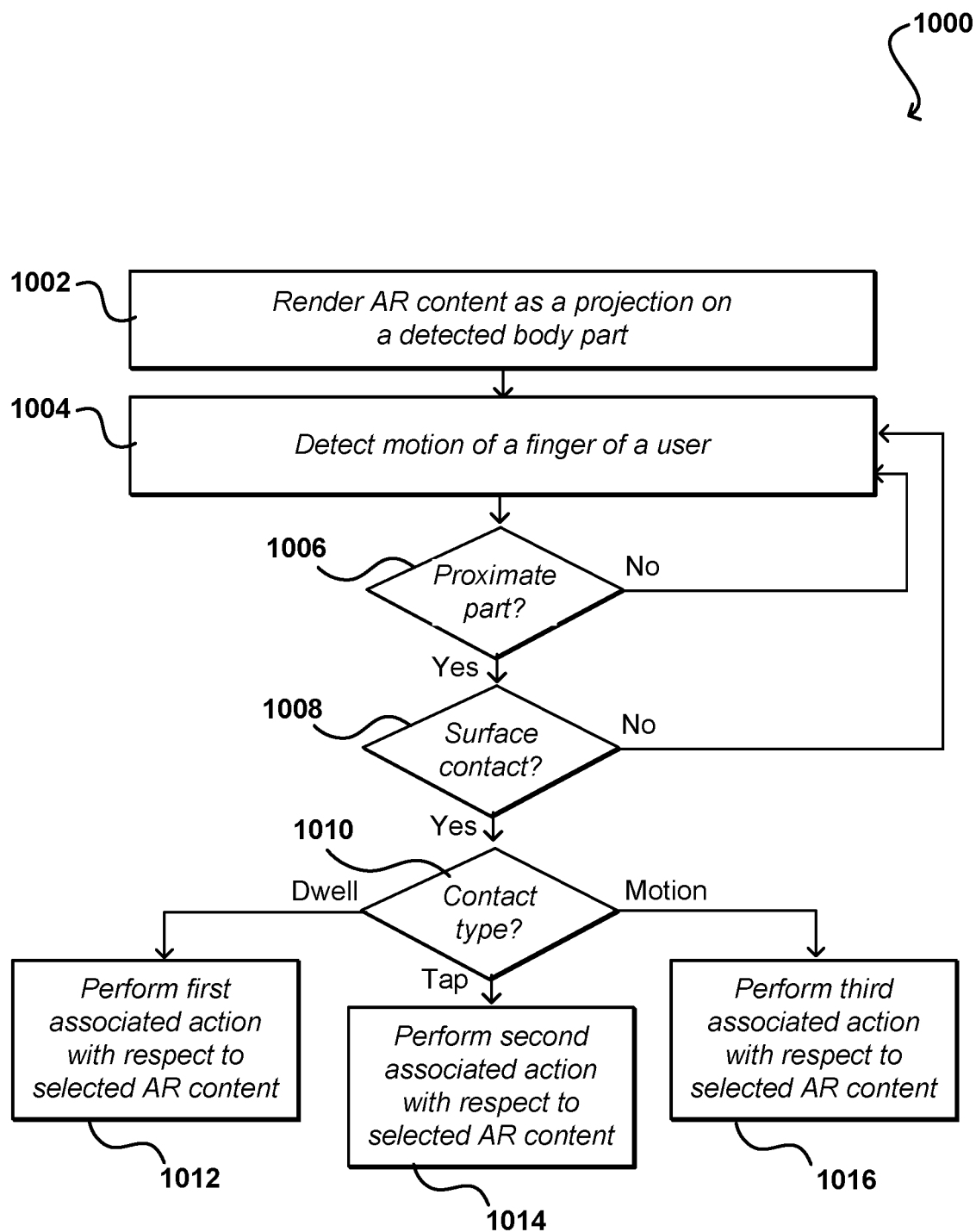
FIG. 10 illustrates an example process for changing a display of AR content based on a type of determined movement of a body part of a user that can be utilized in accordance with various embodiments.

FIG. 10 illustrates an example process 1000 for determining an action to take based on a selection action that can be utilized in accordance with various embodiments. In this example, AR content is rendered 1000 as a projection on a detected body part, such as may be performed using the processes of FIG. 8 or 9. During the display of the AR content, motion of a finger (or other selection object) can be detected 1004, such as by analyzing point data generated for the scene and recognizing a finger a view of an AR application. A determination can be made 1006 as to whether the finger is proximate the body part, such as within a determined distance of the part. This may include, for example, being within an inch or other detectable distance from the part in some embodiments, which can be determined to be likely to be associated with a selection action or other action gesture with respect to the AR content. If so, a determination can be made 1008 as to whether surface contact has occurred. As mentioned, an advantage of body surface projections is the tactile feedback provided to the user through a contact, and thus many selection actions can include at least some amount of contact between the finger and the body part. The contact can be detected using a number of different approaches such as those discussed herein, as may include position determinations or skin deformations, among other such options. If contact is detected then another determination can be made 1010 as to the type of contact made. As mentioned, there may be different actions intended for different motions or gestures of the user finger with respect to the content. For example, if the contact type is determined to be a dwell then a first action can be performed 1012 with respect to the selected AR content. This may be similar to an action performed using a touch screen interface, where contacting an option or element of the AR content for at least a minimum period of time can cause a specific action to occur, such as to open or access content related to the selected element. If the type of contact is instead determined to be a tap, or a short period of contact, then a second action can be performed 1014, which may be to select that particular item or element, among other such options. As mentioned, the type of contact detected may also correspond to a motion, such as may begin, end, or involve the contact point. If so, a third action can be performed with respect to the AR content, as may involve scrolling through a list, moving to a next page or group, dragging an element to another location, etc. Once example of a "motion selection" that could be detected in some embodiments would be a swiping motion or gesture that is parallel to the content displayed, or perpendicular to the orientation of the user's body part, among other such options. For a list of items displayed on a user's forearm, for example, one such motion that could select an item would be a "swipe," or dragging of the finger relative to the surface, that is perpendicular to the orientation of the forearm. Various other types of actions can be performed for other types of contact as well as discussed and suggested herein.

Figure 11:
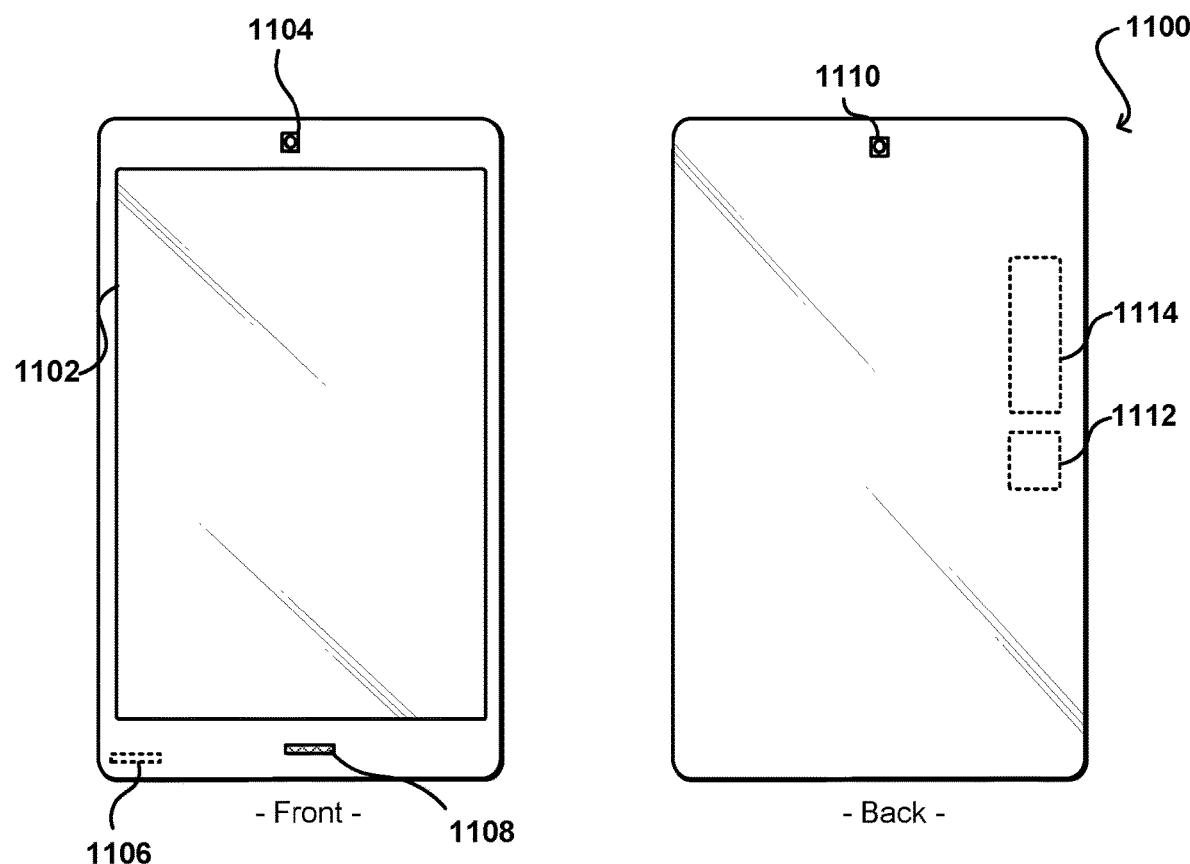
FIG. 11 illustrates an example computing device that can execute an augmented reality application in accordance with various embodiments.

FIG. 11 illustrates front and back views of an example electronic computing device 1100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 1100 has a display screen 1102 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled device (CCD), a motion detection sensor or an infrared sensor, or other image capturing technology.

As discussed, the device can use the images (e.g., still or video) captured from the imaging elements 1104 and 1110 to generate a three-dimensional simulation of the surrounding environment (e.g., a virtual reality of the surrounding environment for display on the display screen of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 1108 on the front side of the device. In some devices there may be only one microphone, while in other devices there might be at least one microphone on each side and/or corner of the device, or in other appropriate locations.

The device 1100 in this example also includes one or more orientation- or position-determining elements 1112 operable to provide information such as a position, direction, motion, or orientation of the device. These elements can include, for example, accelerometers, inertial sensors, electronic gyroscopes, and electronic compasses. The example device also includes at least one communication mechanism 1106, such as may include at least one wired or wireless component operable to communicate with one or more electronic devices. The device also includes a power system 1114, such as may include a battery operable to be recharged through conventional plug-in approaches, or through other approaches such as capacitive charging through proximity with a power mat or other such device. Various other elements and/or combinations are possible as well within the scope of various embodiments.

Figure 12:
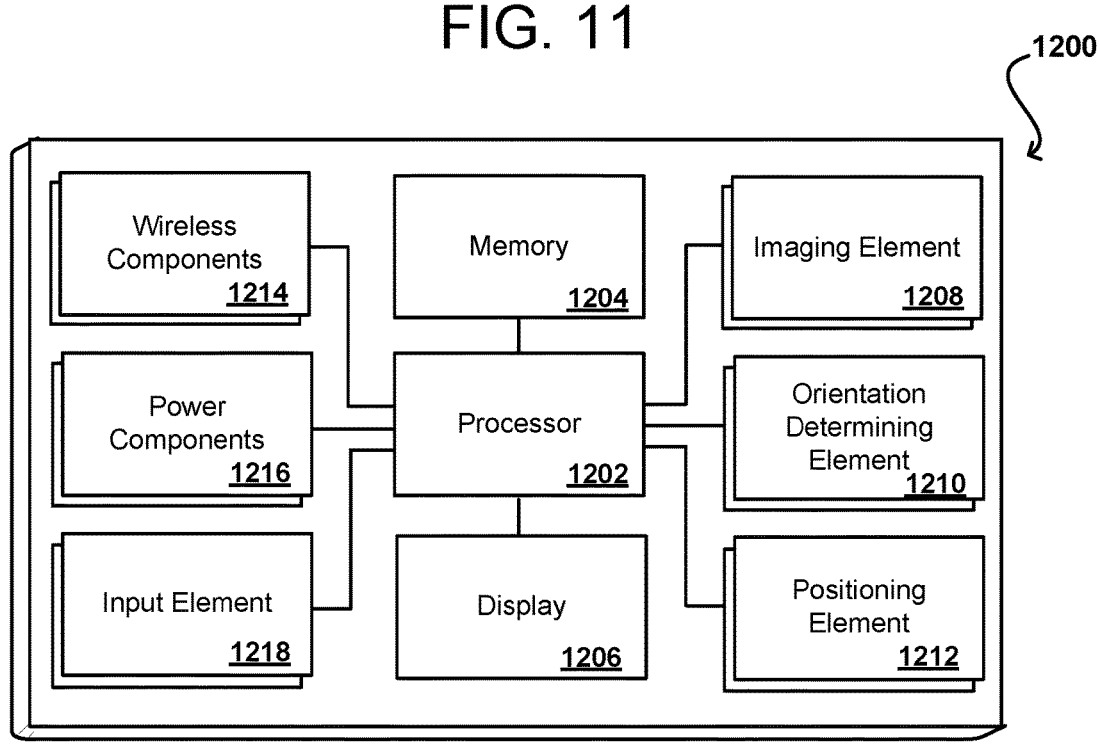
FIG. 12 illustrates example components of a computing device that can be used to implement aspects of the various embodiments.

FIG. 12 illustrates a set of basic components of an electronic computing device 1200 such as the device 1100 described with respect to FIG. 11. In this example, the device includes at least one processing unit 1202 for executing instructions that can be stored in a memory device or element 1204. As would be apparent to one of ordinary skill in the art, the device can include many types of memory, data storage, or computer-readable media, such as a first data storage for program instructions for execution by the processing unit(s) 1202, the same or separate storage can be used for images or data, a removable memory can be available for sharing information with other devices, and any number of communication approaches can be available for sharing with other devices.

The device typically will include some type of display screen 1206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1200 also includes at least one orientation determining element 1210 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1212 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1214 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1218 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining augmented reality content associated with a current geographic location of a computing device;
    detecting, using at least one sensor of a computing device, a presence of an object of a user in a field of view of a display device for displaying the augmented reality content;
    determining, using a processor of the computing device, a surface region of the object for use in positioning the augmented reality content;
    causing the augmented reality content to be rendered to appear, when displayed via the display device, to be positioned on the surface region of the object in the field of view;
    detecting, using the at least one sensor, an interaction of the user with the object at a determined position within the surface region based on detecting the interaction occurring at the determined position; and
    performing an action corresponding to the augmented reality content associated with the determined position as displayed via the display device.

2. The computer-implemented method of claim 1, further comprising:
    determining an orientation of the object in the field of view; and
    determining a type of the augmented reality content to be displayed, with respect to the surface region, based at least in part upon the determined orientation of the object.

3. The computer-implemented method of claim 1, wherein the object is a hand and wherein the interaction of the user with the object is a finger of the user stopping at the predetermined position, and further comprising:

determining the interaction of the user with the object based at least in part upon a position of the finger with respect to the hand or a deformation of the hand proximate a point of contact.

4. The computer-implemented method of claim 1, further comprising:
 detecting motion of the object;
 determining that the motion corresponds to an input gesture; and
 performing an action corresponding to the input gesture with respect to the augmented reality content displayed.

5. The computer-implemented method of claim 1, further comprising:
 causing the augmented reality content positioned on the surface region of the object to have a shape conforming to the surface region.

6. A computer-implemented method, comprising:
 determining a portion of a user's body visible in a display of a computing device;
 determining augmented reality content associated with a current geographic location of a computing device to be displayed via the display;
 causing at least a portion of the augmented reality content to be rendered to appear, when displayed via the display, to be positioned on a determined surface of the portion of the user's body;
 determining contact of an object with the determined surface of the portion of the user's body based on detecting a stop of motion of the finger at a location on the determined surface; and
 performing an action corresponding to the augmented reality content associated with a contact position of the object on the determined surface.

7. The computer-implemented method of claim 6, further comprising:
 determining the object coming into contact with the determined surface based at least in part upon a position of the object with respect to the portion of the user's body or a deformation of the portion of the user's body proximate a point of contact.

8. The computer-implemented method of claim 6, further comprising:
 capturing image data using a camera of the computing device; and
 rendering the augmented reality content as an overlay element over a live view of a scene captured by the camera and displayed using the display of the computing device.

9. The computer-implemented method of claim 6, further comprising:
 determining a location or orientation of the computing device; and
 determining the augmented reality content based at least in part upon the location or orientation.

10. The computer-implemented method of claim 9, further comprising:
 determining a type of body part of the portion of the user's body visible in the display of the computing device; and
 determining the augmented reality content based further upon the type of body part.

11. The computer-implemented method of claim 10, further comprising:
 determining an orientation of the body part as visible in the display of the computing device; and
 determining the augmented reality content based further upon the orientation of the body part.

12. The computer-implemented method of claim 6, further comprising:
 causing the augmented reality content to be rendered to appear have a shape conforming to the determined surface of the portion of the user's body.

13. The computer-implemented method of claim 6, further comprising:
 detecting motion of the user's body;
 determining that the motion corresponds to an input gesture; and
 performing an action corresponding to the input gesture with respect to the augmented reality content displayed.

14. The computer-implemented method of claim 6, further comprising:
 causing the augmented reality content to be displayed in a display of a wearable device of the user in communication with the computing device.

15. A system, comprising:
 at least one processor; and
 memory including instructions that, when executed by the at least one processor, cause the system to:
 determine a portion of a user's body visible in a display of a computing device;
 determine augmented reality content associated with a current geographic location of a computing device to be displayed via the display;
 cause at least a portion of the augmented reality content to be rendered to appear, when displayed via the display, to be positioned on a determined surface of the portion of the user's body;
 determine contact of an object with the determined surface of the portion of the user's body based on a stop of motion of the finger at a location on the determined surface; and
 perform an action corresponding to the augmented reality content associated with a contact position of the object on the determined surface.

16. The system of claim 15, wherein the instructions when executed further cause the system to:
 determine the object coming into contact with the determined surface based at least in part upon a position of the object with respect to the portion of the user's body or a deformation of the portion of the user's body proximate a point of contact.

17. The system of claim 15, wherein the instructions when executed further cause the system to:
 capture image data using a camera of the computing device; and
 render the augmented reality content as an overlay element over a live view of a scene captured by the camera and displayed using the display of the computing device.

18. The system of claim 15, wherein the instructions when executed further cause the system to:
 determine a location or orientation of the computing device;
 determine a type of body part of the portion of the user's body visible in the display of the computing device; and
 determine the augmented reality content based at least in part upon the location or orientation, as well as the type of body part.

* * * * *